Inventor
GOMER L. DAVIES
GERALD H. WINTERMUTE

Oct. 6, 1942.  G. H. WINTERMUTE ET AL  2,297,822
RADIO LANDING CONTROL SYSTEM
Filed June 23, 1941   3 Sheets-Sheet 2

Inventor
GOMER L. DAVIES
GERALD H. WINTERMUTE
By Samuel Scrivener Jr.
Attorney

Inventor
GOMER L. DAVIES
GERALD H. WINTERMUTE

Patented Oct. 6, 1942

2,297,822

UNITED STATES PATENT OFFICE 2,297,822

RADIO LANDING CONTROL SYSTEM

Gerald H. Wintermute, Washington, D. C., and Gomer L. Davies, Woodside, Md., assignors to Washington Institute of Technology, Inc., Washington, D. C., a corporation of Delaware Application June 23, 1941, Serial No. 399,360 In Great Britain February 20, 1939

5 Claims. (Cl. 177—352)

This application is a continuation in part of application Serial No. 153,858, filed July 15, 1937, now abandoned.

This invention relates to radio landing systems for aircraft and, more particularly, is intended to provide new and improved indicating and operating means for inclusion in or cooperation with such systems.

It has heretofore been proposed and is at present known to provide systems of various types for guiding landing aircraft during periods of low visibility or congested airport traffic and for providing indications on the aircraft of the position and heading of the aircraft with respect to the landing area. The present invention is generally applicable to all known types of landing systems and is not to be understood as being limited in any way to any one or more of such types of systems although for purposes of illustration, the invention is described herein in connection with a radio landing system.

It is well known that aircraft landings cannot always be made in one direction on a particular airport or landing area, but must be effected in different directions from time to time in accordance with shifts in the direction of the wind or, particularly with respect to airport traffic control systems, in order to regulate and control the proper use of the landing area.

It is a principal object of the invention to provide a plurality of fixed stations disposed about the periphery of a landing area or airport and intended, constructed and equipped for the reception, positioning and operation of mobile transmitting means used in the establishment of the radiated fields of the landing system, whereby such transmitting means may be properly positioned with respect to any desired or necessary direction of landing. The invention is further intended to provide means, operable either at any such station or at a remote point, for indicating at which station the mobile transmitting means is located.

In landing systems or airport traffic control systems one or more transmitting means, known usually as marker beacons, are placed adjacent to or materially spaced from the edge of the landing area and are adapted to establish radiated fields which may be received by an approaching aircraft to provide an indication on the aircraft of the position thereof with respect to the landing area. In accordance with the present invention each marker beacon is positioned at the opposite side of the landing area from one of the positioning stations referred to, both the marker beacon and the positioning station being in the prolongation of a runway on the landing area. In connection with such marker beacons, it is an object of this invention to provide means which are operable to indicate at any desired place the condition of operation of the marker beacon which is located opposite the positioning station at which the mobile transmitting means is located.

Other objects and features of novelty of the invention will be apparent from the following description and the annexed drawings, it being expressly understood, however, that such description and drawings are only illustrative of the invention and that the invention is not limited thereby or otherwise than by the appended claims.

Referring to the drawings, in which similar reference letters and numerals refer to like parts, Fig. 1 is a diagrammatic view of an airport or other landing area, showing the general relation thereto of systems and apparatus according to the present invention;

Figure 1:
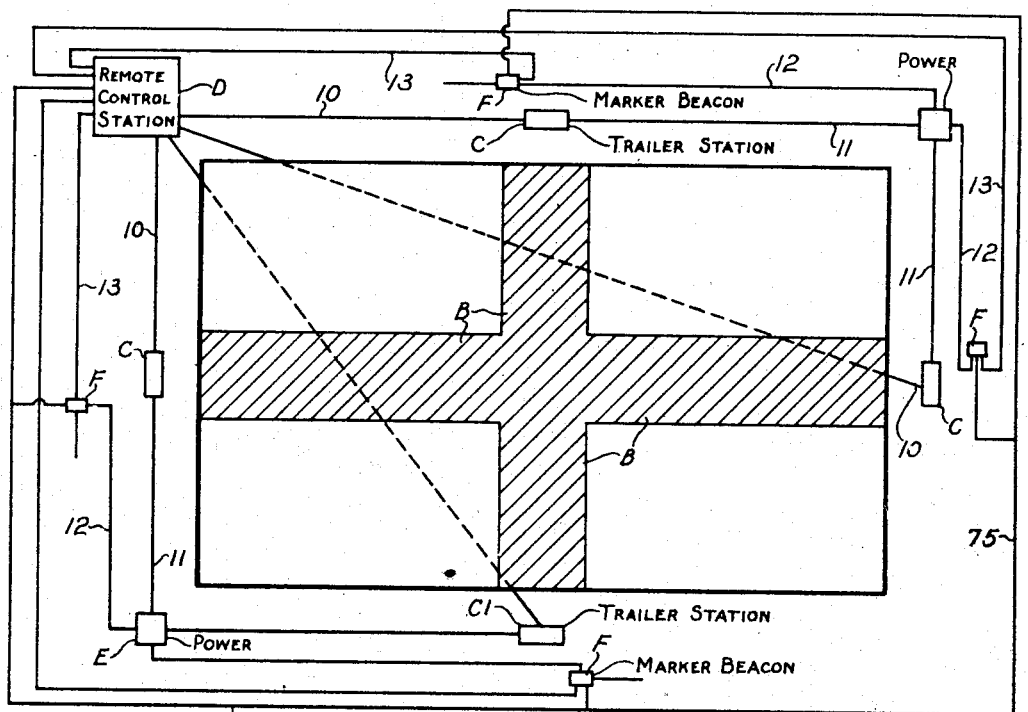
Figures 2, 4:
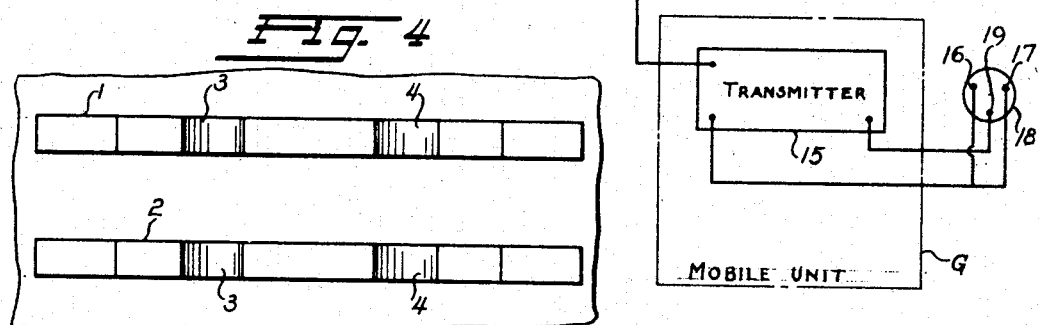
Fig. 2 is a diagrammatic showing of a mobile transmitting means with electrical connections thereto.
Figs. 4 and 5 are, respectively, a plan view and a side elevational view of a preferred means for positioning the mobile transmitting means at each fixed station about the airport.
Figure 5:
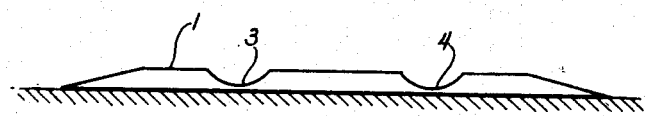

Referring particularly to Fig. 1 of the drawings there is diagrammatically illustrated an airport or other landing area A which may be of any size or shape whatsoever and which is provided with one or more runways B which may extend in any desired direction or directions with respect to the landing area. Means are provided by the invention for selectively positioning a mobile radio transmitting means at a plurality of predetermined locations about the airport. Such means comprise fixed stations C which are constructed and adapted for the reception, positioning and operation of the mobile transmitting means. Such stations may be disposed at any desired points with respect to the landing area but, in the preferred form of the invention, one of such stations is positioned at each end of each of the airport runways in order that landings may be effected in either direction on any runway. Further, in the preferred form of the invention, the positioning means C comprise permanent installations, positioned as hereinbefore indicated, and which are intended and adapted to receive a trailer or other mobile unit within which the transmitting means is housed or placed. In Figs. 4 and 5 of the drawings there is illustrated one form which each of the trailer positioning stations C may take. These stations, as illustrated, comprise parallel concrete runways 1, 2 which are spaced apart by the normal spacing between the wheels on the opposite sides of a trailer. Each runway is provided with depressions 3, 4 which are spaced apart along the length of the respective runways by the normal spacing between the wheels on the same side of a trailer. These depressions are preferably arcuate in cross-section in order to receive and hold the lower parts of the wheels of a trailer. It will be seen that a trailer may be driven onto the two runways until the wheels thereof are received within the four depressions. Thus, a single trailer or other mobile unit may be provided for each airport and such trailer may be moved from one station C to another in order to be properly positioned with respect to any runway on which it is desired to effect landing operations. By means of this combination it will be seen that complete coverage of the airport will be provided in order that provision may be made for any shift in wind direction or any traffic situation.

In further accordance with the invention means are provided for energizing the mobile transmitting unit when positioned at any station and for indicating at any desired place the station at which the mobile transmitting means is located.

These indicating means are disclosed generally in Fig. 1, in which each of the stations C is shown to be connected, through an electrical connection 10, to a remote control station D which may be positioned at any desired local or remote point with respect to the landing area A. Each of the trailer stations C is also connected, through an electrical connection 11, to a source of electric power E which may be disposed at any suitable point with respect to the landing area. At least one marker beacon as described hereinbefore is preferably positioned adjacent each end of each runway and these are illustrated diagrammatically at F in Fig. 1, each marker beacon being connected by lead 12 to a power source E. In order to control the marker beacon and provide indications as will be described hereinafter each marker beacon is also connected by leads 13 and 75 to the remote control station D.

In Fig. 2 of the drawings there is illustrated diagrammatically a mobile unit G, such as a trailer, which may be received on and positioned by any one of the fixed stations C. If positioning means such as are shown in Figs. 4 and 5 are employed a wheeled trailer would preferably be used as the mobile unit G. The mobile unit carries suitable radio transmitting means 15 for radiating the field or fields useful in establishing a radio landing system for aircraft. One input terminal of the transmitting means is connected electrically to the two terminals 16, 17 of a trailer control plug 18 which is carried by the trailer, while the second terminal is connected to the third terminal 19 of the plug, all for a purpose which will be explained fully hereinafter.

Figure 3:
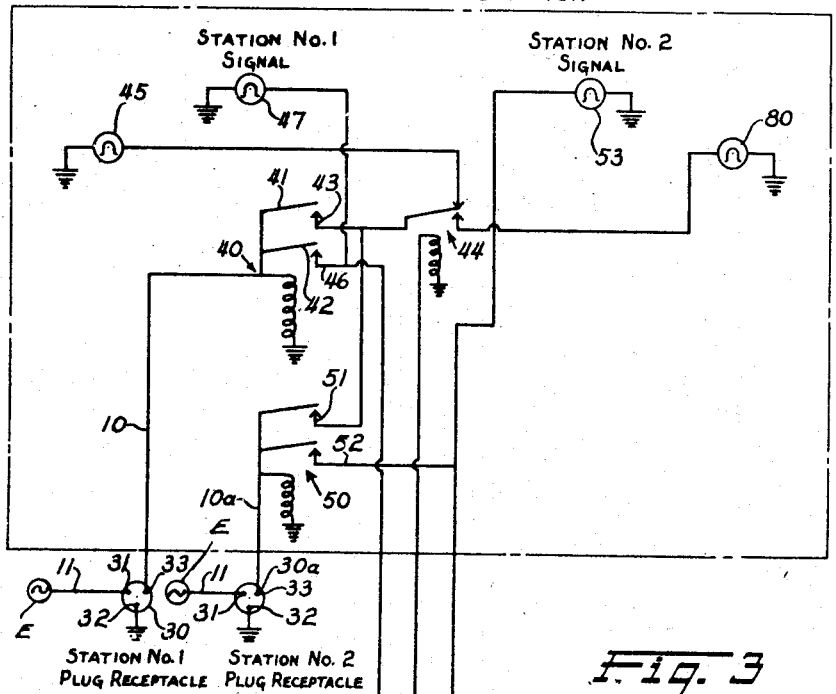
Fig. 3 is a circuit diagram showing the interconnection of various parts of the invention.
Figure 3:
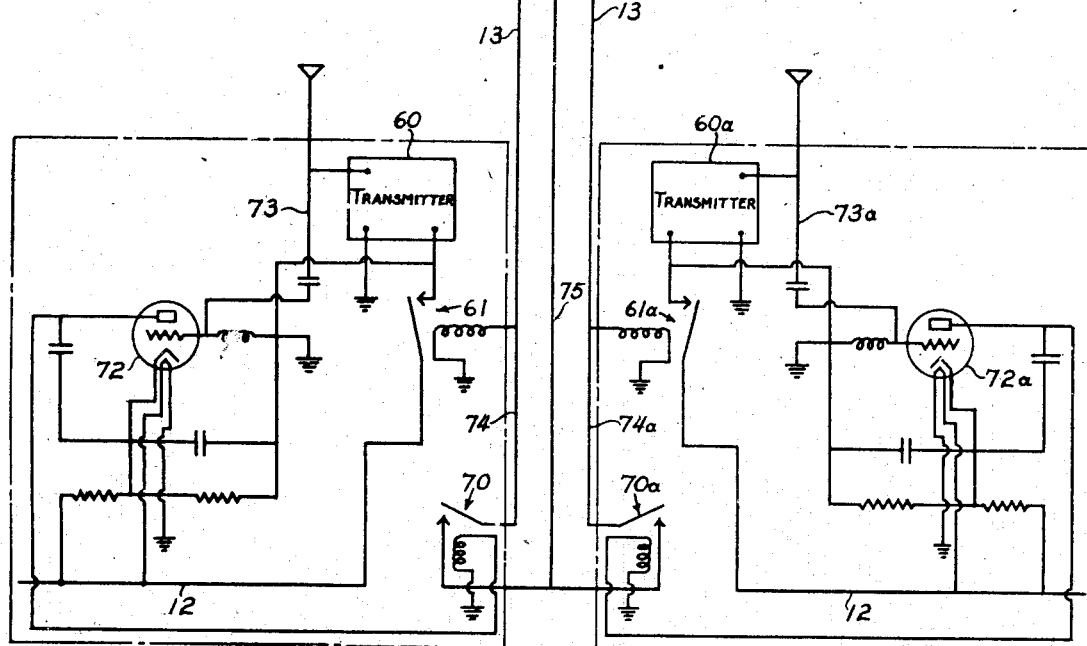

In Fig. 3 of the drawings there are disclosed means including electrical circuits and apparatus for providing, at a remote control station or any other point, an indication showing the station at which the transmitting means is located and the condition of operation of the marker beacon which is located oppositely to that station. Located at each trailer station C is a plug receptacle 30 or 30a which is adapted to receive and cooperate with the trailer control plug 18 and which includes three terminals registering with those of the trailer control plug. One of these terminals namely 31, is connected to the power side of source E through lead 11, while another terminal 32 is grounded to complete the power supply circuit to transmitter 15. The third terminal 33 of each receptacle 30 is connected through lead 10 or 10a to the remote control station D, all as illustrated in Figs. 1 and 3. It will be seen that terminals 16, 17 and 19 of trailer control plug 18 will cooperate, respectively, with terminals 31, 33 and 32 of the plug receptacle 30, 30a at each station C. Thus, when the trailer G is positioned at any station C and the plug 18 inserted into receptacle 30, power will be supplied across terminals 16 and 19, thereby energizing the transmitter 15, and will simultaneously be supplied to lead 10, which is connected to the remote control station, for a purpose and with a result which will be explained hereinafter.

Means are provided by the invention for indicating, at the remote control station D, the station at which the mobile transmitting means is located, such means being operable by insertion of the trailer control plug 18 into the plug receptacle at any station and energization of the control system. Such means are illustrated in Fig. 3 of the drawings. In Fig. 3 two trailer station plug receptacles 30 and 30a are illustrated but it will be understood that the number of such receptacles in any system according to this invention will be equal to the number of stations arranged about the airport. The terminal 33 of receptacle 30 is connected by lead 10 to one terminal of the operating coil of a double relay 40, the other terminal of which is grounded. One of the fixed contacts 43 of the double relay device is connected to the movable contact of a second relay 44 which is normally in electrical connection with one terminal of a red signal light 45, the other terminal of which is grounded. The second fixed contact 46 of the double relay 40 is connected to one terminal of a station indicating signal 47, the other terminal of which is grounded. The signal 47 will be energized only when the trailer plug 18 is placed in a particular trailer station receptacle, such as 30, and the trailer station corresponding to signal 47 may be designated as station No. 1 and the signal 47 as station No. 1 signal, as indicated in the drawings.

At another station which may be designated as station No. 2 there will be positioned a plug receptacle which is designated as 30a in the drawings and terminal 33 of which is connected by lead 10a to one terminal of the operating coil of a double relay 50, the other terminal of the coil being grounded. One of the fixed contacts 51 of the relay 50 is connected to the movable contact of relay 44, it being remembered that such movable contact is normally in electrical connection with one terminal of the red signal 45. The second fixed contact 52 of the relay 50 is connected to a second station signal 53, the opposite terminal of which is grounded. Signal 53 will be energized only when the trailer plug 18 is placed in a particular trailer station receptacle, such as 30a, and the trailer station corresponding to signal 53 may be designated as station No. 2 and the signal 53 as station No. 2 signal, as indicated in the drawings.

At another station which may be designated as station No. 2 there will be positioned a plug receptacle which is designated as 30a in the drawings and terminal 33 of which is connected by lead 10a to one terminal of the operating coil of a double relay 50, the other terminal of the coil being grounded. One of the fixed contacts 51 of the relay 50 is connected to the movable contact of relay 44, it being remembered that such movable contact is normally in electrical connection with one terminal of the red signal 45. The second fixed contact 52 of the relay 50 is connected to a second station signal 53, the opposite terminal of which is grounded. Signal 53 will be energized only when the trailer plug 18 is placed in a particular trailer station receptacle, such as 30a, and the trailer station corresponding to signal 53 may be designated as station No. 2 and the signal 53 as station No. 2 signal, as indicated in the drawings.

In the operation of the system described it will be understood that the trailer G may be positioned at any one of the trailer stations C which are arranged about the airport and which are illustrated in Fig. 1. After such positioning of the trailer, the trailer control plug 18 is inserted into the control plug receptacle associated with the trailer station at which the trailer is positioned. If the trailer is positioned at Station No. 1, at which plug receptacle 30 is located, and after the operation of any control switch, power from the source E will be supplied through lead 11 and terminals 31, 32, 16 and 19 to the transmitter 15 which is housed in the mobile unit and will also be supplied through lead 10 to the relay 40 which is located at the remote control station D, thereby operating such relay. Power will then be supplied through fixed contact 43 and the movable contact of relay 44 to the red signal 45 thereby energizing the same and providing an indication at the remote control station that power has been supplied to the transmitter 15 and that the marker beacon has not yet become operative. At the same time power will be supplied through the second movable contact of relay 40 and fixed contact 46 to the signal 47, thereby indicating at the remote control station that the trailer has been positioned on trailer station No. 1 and that power is being supplied thereto.

If the trailer G is positioned at trailer station No. 2 the trailer control plug 18 will be engaged with trailer station receptacle 30a and, after the operation of any control switch, power will be supplied to the transmitter located on the trailer and to the relay 50 thereby operating the same. Power will then be supplied through power line 10a and movable contact 51 of relay 50 and the movable contact of relay 44 to the signal 45 to provide an indication that power has been supplied to the transmitter but that the marker beacon is not yet in operation, as will be described hereinafter. At the same time power will be supplied through fixed contact 52 of relay 50 to the signal 53 thereby indicating at the remote control station that the trailer has been positioned at trailer station No. 2.

It will be apparent that it will not be necessary to operate all of the marker beacons at any one time, but that it will only be necessary to operate that marker beacon which is positioned at the end of the runway toward which an aircraft is approaching and at the opposite end of which the mobile transmitting unit has been placed. Thus, referring to Fig. 1, if the mobile transmitting unit is positioned at station C1, it will be necessary only to operate marker beacon F1. Means are provided by the invention for energizing the proper marker beacon simultaneously with the energization of the mobile transmitting unit after the same has been positioned at the trailer station at the end of the runway which is to be used. Referring to Fig. 3 of the drawings, it will be seen that two marker beacons have been disclosed, each of these corresponding to and operating with one of the trailer stations. Marker beacon No. 1 comprises a transmitter 60 which is connected to the source of power E through lead 12 and the movable contact of a relay 61. One terminal of the operating coil of the relay 61 is connected to the fixed contact 46 of relay 40, the other terminal of the coil being grounded. The relay 40 will be operated as hereinbefore described upon the connection of the trailer control plug to trailer station receptacle No. 1, and upon the operation of the relay power will be supplied to the operating coil of relay 61 thereby energizing the relay and connecting the marker beacon transmitter to power.

Means are provided by the present invention for providing a signal at the remote control station D that the marker beacon has been placed in operation. Such means comprise a relay 70 which is adapted to be operated by current supplied to the antenna of the marker beacon transmitter, and which is therefore energized at all times when the marker beacon transmitter is energized. In order to effect this, one terminal of the operating coil of relay 70 is connected to ground while the other is connected to the plate circuit of a vacuum tube 72, the grid of which is connected to the antenna circuit 73 which is supplied by the marker beacon transmitter 60. The relay 70 will therefore be energized and the movable contact thereof closed so long as the transmitter 60 is operating. Therefore, when the marker beacon is energized power will be supplied through line 10, contacts 42 and 46 of relay 40, lead 74, the contacts of relay 70, lead 75 and the energizing coil of relay 44, thereby operating the relay 44 and causing the movable contact thereof to move from electrical engagement with red signal 45 into engagement with one terminal of a green signal 80, the opposite terminal of which is grounded. The red signal 45 will therefore be de-energized and the green signal 80 will be operated to indicate at the remote control station D that the marker beacon is energized and is operating properly.

Any failure of the marker beacon or any failure in the supply of power thereto will cause the relay 70 to be de-energized, thereby de-energizing the relay 44, whereupon the movable contact thereof will be moved, causing de-energization of the green signal 80 and energization of the red signal 45, providing an indication at the remote control station that the marker beacon has failed.

In the event that the trailer or mobile transmitting unit is positioned at any trailer station except station No. 1, such for example as trailer station No. 2, the trailer control plug 18 will be inserted into the receptacle 30a which is located at trailer station No. 2 thereby causing operation of marker beacon No. 2 and the signals 45 and 80 in precisely the manner described hereinbefore with respect to marker beacon No. 1. The various circuit and other elements of marker beacon No. 2 have been given, in Fig. 3, numerals corresponding to those of marker beacon No. 1, and the operation of the two will be understood to be the same.

While the circuits for only two marker beacons have been illustrated in Fig. 3 it will be apparent that similar circuits may be provided for any number of marker beacons and that all of such marker beacon circuits will provide the indications hereinbefore described with respect to the two marker beacons. It will also be apparent that when the trailer is positioned at one particular trailer station and the trailer control plug is connected to the trailer station receptacle for that particular station the circuits for marker beacons other than those particularly intended for operation with the runway for which the trailer has been positioned will not be supplied with power and will remain inoperative. It will therefore be seen that only one station indicating signal, such as either of signals 47 and 53, will be operated for any position of the trailer. Due to this feature, there will always be provided at the remote control station a precise and accurate indication of the position of the mobile transmitting unit.

In the operation and use of the entire system as hereinbefore described the mobile transmitting unit may be positioned at any one of the trailer stations disposed on or about or adjacent the airport or landing area A and, after such positioning of the trailer, the trailer control plug 18 will be connected to the plug receptacle which is located at the trailer station at which the mobile power unit is positioned. Immediately upon such connection of the trailer control plug to the station receptacle and upon the operation of any control switch power will be supplied to the transmitters of the landing system which are located within or upon the trailer. At the same time power will be supplied to the connected relay at the remote control station D, such for example as either of relays 40 or 50, thereby energizing such relay and causing the operation of the red signal 45 to indicate that power has been supplied to the landing system transmitter and to also indicate that the marker beacon transmitter has not yet been energized. Simultaneously, power will be supplied through the operated relay, either 40 or 50, to the marker beacon power control relay, such as either of relays 61 or 61a, which corresponds to the trailer position, thereby supplying power to the marker beacon transmitter. Upon the operation of the marker beacon transmitter, and provided that such transmitter is functioning properly, the associated marker beacon monitor relay, either 70 or 70a, will be energized, thereby causing the operation of relay 44 to de-energize the red signal 45 at the remote control station and operate the green signal 80, thereby providing an indication that the marker beacon is operating properly. Simultaneously with the connection of the trailer control plug 18 to the control plug receptacle at the trailer station at which the mobile power unit is positioned power will be supplied to the station indicating signal, either 47 or 53, thereby providing an indication at the remote control station of the location of the mobile power unit.

Figure 6:
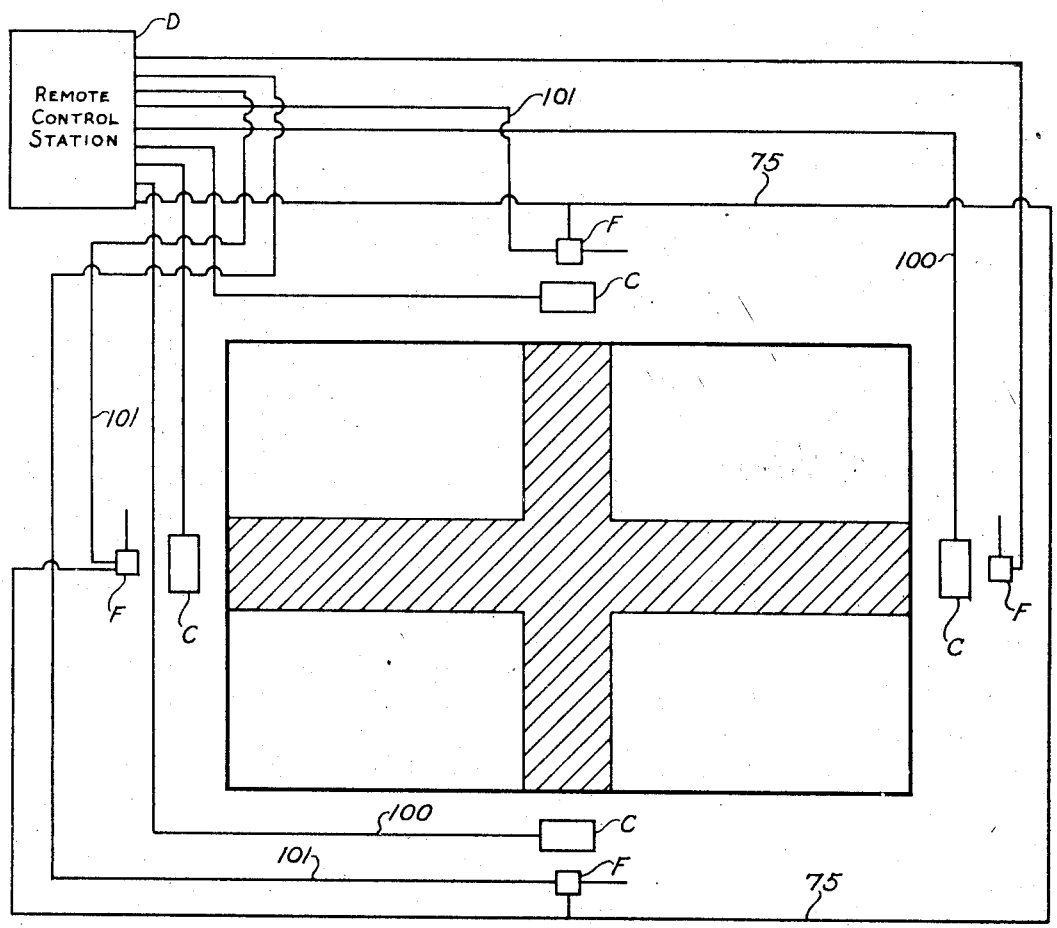
Fig. 6 is a diagrammatic plan view of an airport showing a modified system of connections of trailer stations and marker beacons according to the invention.

In a somewhat modified form of the invention the mobile transmitting means may carry its own source of power. Thus, a motor-generator set may be carried by the trailer in which the transmitters for the radio landing system are carried. In such a system the arrangement of control wires about the airport will be as shown in Fig. 6, in which the local sources of power E are omitted, each of the positioning stations C and marker beacons F being connected only to the remote control station D by wires 100 and 101, 175 respectively.

Figure 7:
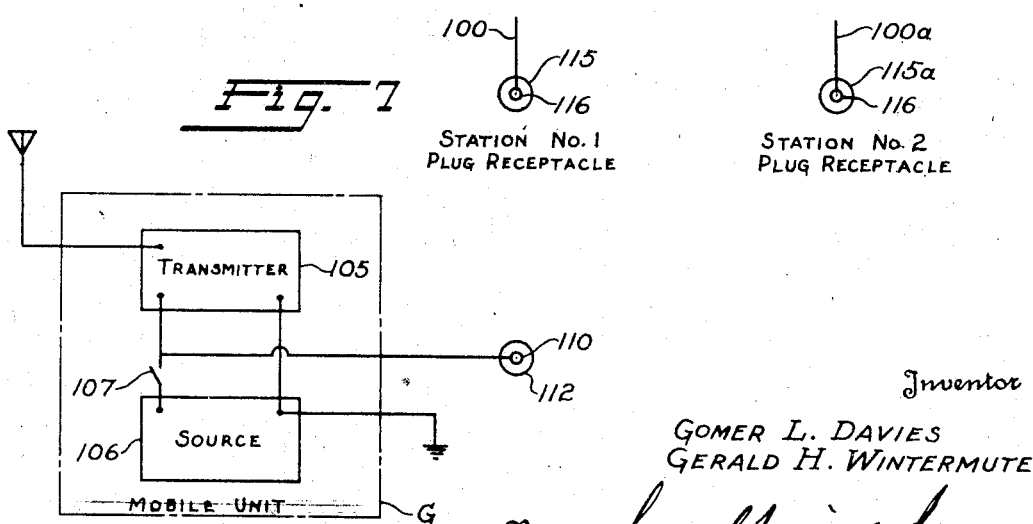
Fig. 7 is a diagrammatic view of a mobile transmitting unit to be used with the system of Fig. 6.

As shown in Fig. 7, each mobile transmitting unit G carries a transmitter 105 and a source of energy 106, such as a motor-generator set, the source being connected to the transmitter through switch means 107. The power terminal of the source is connected through switch 106 to the contact 110 of a trailer plug 112. At each trailer positioning station C there is located a plug receptacle 115 or 115a having a contact 116 or 116a which corresponds to and co-operates with the trailer plug contact 110 when the trailer plug is inserted in the receptacle. Each contact 116 or 116a is connected by lead 100 or 100a to the remote control station D. Each lead 100 or 100a corresponds in every way to lead 10 or lead 10a of Figs. 1 and 3 and the remainder of the system of Fig. 5 is exactly as shown in Fig. 3. In other words, the sole difference between the system of Figs. 1 to 3 and that of Figs. 4 and 5 lies in the location of the source of power and the minor changes of connections and plug and receptacle contacts necessary to accommodate such difference.

It will be apparent to those skilled in the art that we have provided a complete control and indicating system for an airport or landing area having a plurality of stations disposed thereabout upon or at which a mobile transmitting unit may be selectively placed and that such control and indicating means will provide proper and necessary indications at the remote control or other point of the operating condition of the marker beacons as well as an indication of the exact location of the mobile transmitting unit.

While we have illustrated and described only two embodiments of my invention, it will be apparent to those skilled in the art that further modifications and changes and improvements may be made therein without departing in any way from the spirit or scope of the invention. Thus, many circuit variations as well as improvements and modifications in the general system embodied in the invention, may be made within the scope of the appended claims to which reference must be had for the limits of the invention.

What is claimed is:

1. In combination with a landing area such as an airport, a plurality of fixed stations disposed at different points about the periphery of said landing area, each of said stations including means to receive and position a mobile unit including radio transmitting means employed in the radio guided landing of aircraft, a plurality of fixed radio transmitting means arranged about the airport, each of said fixed transmitting means being oppositely disposed from one of said fixed stations, and means operable by energization of said mobile transmitting unit when positioned at any one of said stations for simultaneously energizing the fixed transmitting means which is oppositely disposed with respect thereto.

2. In combination with a landing area such as an airport, a plurality of prepared stations arranged about the periphery thereof, each of said stations including means to receive and position a mobile unit including radio transmitting means forming part of a radio landing system for aircraft, a plurality of fixed radio transmitting means arranged about the periphery of said landing area, each being disposed on the opposite side of the landing area from one of said prepared stations, a source of power connected to each of the fixed transmitting means and having means connected thereto and located at each prepared station for connection to a mobile unit, relay means connected between said source and each of said fixed transmitting means and normally operable to disconnect the same, and means operable upon connection of the mobile transmitting means to the source of power to operate the relay means connected between the source and the fixed transmitting means which is disposed oppositely to the prepared station at which the energized mobile transmitting unit is positioned, to thereby cause such fixed transmitting means to be energized.

3. In combination with a landing area for aircraft, a plurality of prepared stations disposed about the landing area, each of said stations including means to receive and position a mobile unit carrying radio transmitting means forming part of a radio landing system for aircraft, a plurality of fixed radio transmitting means arranged about the landing area, each of said fixed transmitting means being disposed oppositely from one of said prepared stations, means operable by energization of a mobile transmitting unit at one of said prepared stations to energize the fixed transmitting means which is oppositely disposed with respect thereto, indicating means, means operable by energization of the mobile transmitting unit to energize said indicating means, a second indicating means, and means controlled by energy supplied by the fixed transmitting means to de-energize the first-named indicating means and energize the second indicating means.

4. In combination with a landing area such as an airport, a plurality of fixed stations disposed at different points about the periphery of the landing area, each of said stations including means to receive and position a mobile unit including radio transmitting means which are employed in the radio-guided landing of aircraft, means at each station for connecting the radio transmitting means carried by a mobile unit positioned at such station to a source of electric energy, a plurality of fixed radio transmitting means arranged about the landing area, each being oppositely disposed from one of said fixed stations, and means comprising a circuit connected through the mobile transmitting unit positioned at any one of said stations for energizing the fixed transmitting means which is disposed oppositely thereto when such mobile unit is connected to the source of energy.

5. In combination with a landing area such as an airport, a plurality of fixed stations disposed at different points about the periphery of the landing area, each of said stations including means to receive and position a mobile unit including radio transmitting means which are employed in the radio-guided landing of aircraft, a plurality of fixed radio transmitting means arranged about the landing area, each being oppositely disposed from one of said stations, a source of power carried by the mobile unit for energizing the transmitting means carried thereby, circuits including said fixed transmitting means and means located at each station and operable upon connection of the source of power carried by the mobile unit to said station-located means to energize the fixed transmitting means located opposite the station at which the mobile transmitting means is located.

GERALD H. WINTERMUTE.
GOMER L. DAVIES.